(No Model.)
R. N. HARRIS.
COFFEE STRAINER.
No. 492,981. Patented Mar. 7, 1893.
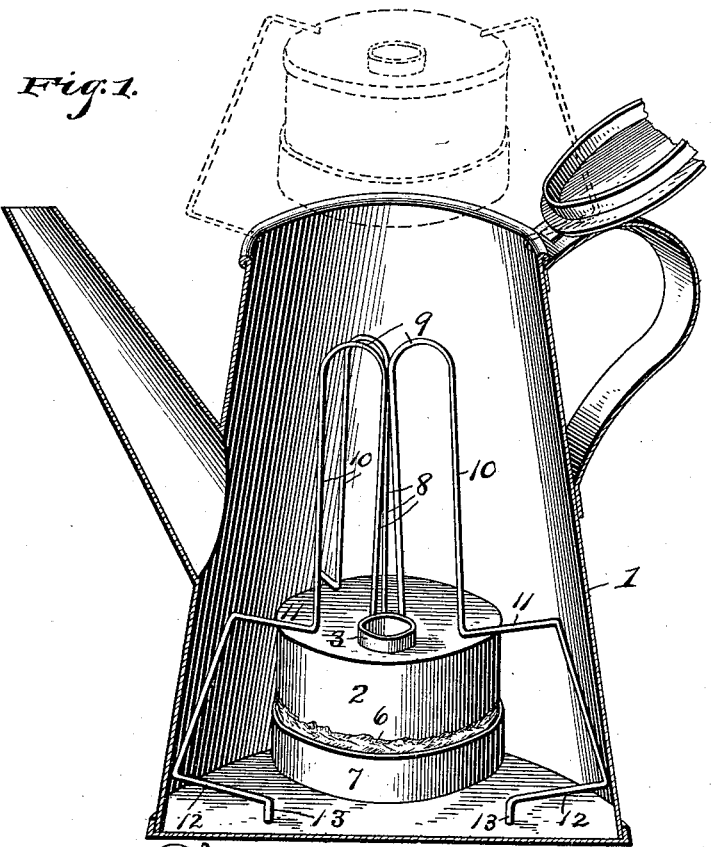
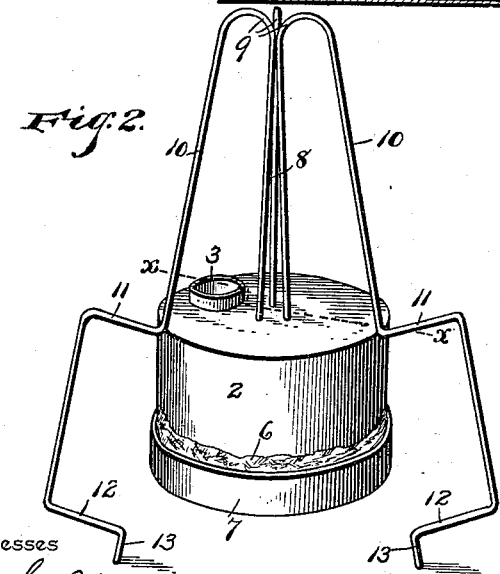
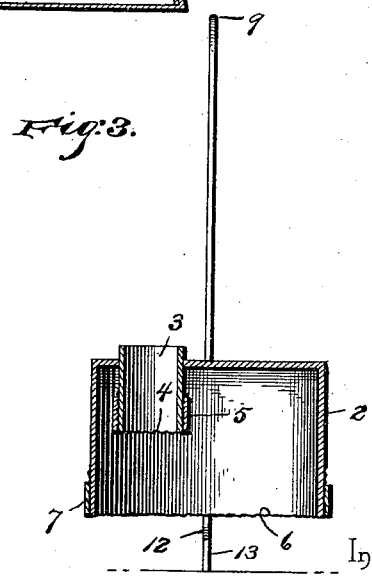
Witnesses
Inventor
R. N. Harris,
By his Attorneys,

UNITED STATES PATENT OFFICE.

ROBERT NELSON HARRIS, OF HICKORY, NORTH CAROLINA.

COFFEE-STRAINER.

SPECIFICATION forming part of Letters Patent No. 492,981, dated March 7, 1893.

Application filed December 17, 1892. Serial No. 455,433. (No model.)

*To all whom it may concern:*

Be it known that I, ROBERT NELSON HARRIS, a citizen of the United States, residing at Hickory, in the county of Catawba and State of North Carolina, have invented a new and useful Coffee-Steamer, of which the following is a specification.

This invention relates to coffee steamers, and has special reference to a device that is removably fitted to an ordinary form of coffee pot, but forming no part of the same.

The object of this invention is to provide a device that may be conveniently used for steaming, straining, and clarifying coffee and so arranged as to prevent the grounds from being deposited in the pot in any manner, the parts being simple and effective in their construction and operation and comparatively inexpensive in manufacture.

The invention consists of the construction and arrangement of parts as will be more fully hereinafter described and claimed.

In the drawings: Figure 1 is a sectional perspective view of a coffee pot and a removable device in position therein embodying the invention, showing the lid of the coffee pot thrown back or open and the device in dotted lines supported on the rim thereof in a position for draining. Fig. 2 is a detail perspective view of the device or attachment removed. Fig. 3 is a central section on the line x—x of Fig. 2.

Similar numerals of reference indicate corresponding parts in the several figures.

Referring to the drawings, the numeral 1 designates a coffee pot or vessel for making coffee therein, and from which the coffee, after being made, is adapted to be poured, that is supplied with a suitable top, a handle and a pouring spout. Within the said coffee pot or vessel is removably mounted a receptacle or cup 2, that is preferably formed cylindrical in shape to conform to the interior contour of the coffee pot as shown, or if desired, the shape of the receptacle or cup may be made in any shape desired. This receptacle or cup is constructed of suitable non-corrosive metal, preferably tin plate, and has the top and side closed and the bottom open.

At one side of the top, adjacent to the periphery thereof, is located a depending tube 3, that extends slightly above the top and a considerable distance down thereinto, and has removably applied to the lower end thereof a straining cloth 4, or analogous device, that is held in position by a band 5 that engages the lower end of the said tube, and that may be replaced at any time by another device of a similar nature, as the said band may be readily removed when desired.

A straining-cloth 6 is applied to the open end of the receptacle or cup 2 and is held in position by a removable band 7, in a manner well known in the art and for a purpose readily and fully understood. The receptacle or cup is adapted to receive the coffee grounds or other material with which the improved device is adapted to be employed, and by the use of strainer-cloths it will be observed that the sediment is closely retained in the said cup or receptacle.

From the center of the top of the cup or receptacle vertically rise three wire arms 8, that extend a suitable distance above the said top and are formed with bends 9, that provide grasping-handles that may be unitedly engaged for positioning the device in or withdrawing the same from a coffee pot or other vessel. From the said bends 9 the arms depend vertically, and slightly divergent, as at 10, and are then bent outward substantially at a right angle, as at 11, and again downward at a greater angle of divergence and again bent inward to form shoulders 12, and the ends of the said shoulders are bent at an angle to form feet 13. The portion of said arms between the outwardly-bent portions 11 and the shoulders 12, provide for closely pressing said arms against the receptacle or cup 2, and also stand at such a divergent angle normally as to produce considerable frictional contact by the said arms with the interior surface of the coffee pot or vessel in which the device is mounted, and thereby prevent too loose movement of the device and sustain it in position after it has been mounted as desired. The shoulders 12 are normally below the lowermost termination of the receptacle or cup 2, and the feet 13, extending from the said shoulders terminating at a still lower level, provide means for sustaining the said receptacle or cup above the bottom of the coffee pot or vessel in which it is placed, and thereby provide at all times for a thorough circulation of the water through the ground coffee contained within the receptacle or cup 2, and after the coffee has reached such a state that it may be used, the said position of the receptacle or cup also provides for a continuous percolation of the coffee through the receptacle or cup that acts to sustain the strength of the beverage.

In operating the device, the ground coffee is placed within the receptacle or cup and the covering applied over the bottom thereof in the manner set forth. The wire arms are then pressed closely against the receptacle or cup and the latter is placed within the coffee pot or vessel in such manner that the feet 13 rest upon the bottom of said coffee pot or vessel. Hot water is then poured into the coffee pot or vessel proportionate in quantity to the amount of coffee desired to be made and the coffee pot or vessel is then placed upon the stove to sustain the boiling-point for a few moments. It will be observed that it is not necessary that the pot should be filled with water in order to make the steamer or attachment practicable, as it will work equally well when the receptacle or cup 2 is only partially covered, but it is preferable that the receptacle or cup should be entirely covered, as the water would then flow through the bottom of the said cup or receptacle and the ground coffee and upward through the tube at one side of the top of the same. It will be understood that the arms 8 are formed with considerable spring tension, and that they will cling closely to the inner side of the coffee pot or receptacle and in removing the attachment the bends 9 of the arms 8 may be readily engaged by a suitable hooked device and drawn upward through and out of the coffee pot or receptacle. If the device is adapted to be arranged in position for draining it is slowly drawn upward by the arms 8 until the shoulders 12 reach the rim of the coffee pot or vessel, when they automatically spring outward and rest on the said rim and suspend the receptacle or cup over the opening in the coffee pot or vessel where it may remain for a sufficient length of time to accomplish the desired object. In this latter operation the feet 13 limit the outward movement of the wire arms by striking against the interior portion of the coffee pot or vessel. It will be understood that the arms 8 will be constructed of non-corrosive material for evident purposes.

The attachment set forth operates thoroughly and quickly and leaves the coffee entirely free from grounds and greatly improves the flavor. The coffee being entirely confined in the receptacle or cup and the strength being forced from it by steam, frees it from the scorched taste produced by parching. The tube at the top of the receptacle or cup produces suction as soon as the bottom of the receptacle or cup comes in contact with the boiling water and forces the strength from the coffee in a very rapid manner.

It will be understood that the device is intended to be made in various sizes, and it will be obviously apparent that it can be conveniently employed in making tea or other beverages.

Having described the invention, what is claimed as new is—

1. The herein described attachment consisting of a receptacle or cup having a closed top and side and open bottom, a straining covering removably applied to the bottom of said cup, a tube extending through the closed top at one side thereof and depending into the receptacle or cup, and supplied with a removable straining covering over the lower end thereof, and supporting arms attached to the said receptacle or cup, substantially as described.

2. The herein described attachment, consisting of a receptacle or cup having straining devices in connection therewith and adapted to contain ground coffee or analogous material, and a series of arms secured to the central part of the top of said receptacle or cup and rising vertically therefrom, the said arms being continued downward divergently over and free from the said receptacle or cup and provided with feet at their lower ends below the bottom of the said receptacle or cup to support the latter, substantially as described.

3. The herein described attachment, consisting of a receptacle or cup having straining devices in connection therewith and adapted to contain ground coffee or other material, and a series of spring-arms secured to and rising vertically from the center of the top portion of said receptacle or cup and continued downwardly and divergently over and free from the said receptacle or cup and having an angular bend and a lower shoulder formed in each to provide frictional contact with the inner side of the vessel in which it is mounted, the inner portions of the said lower shoulders having depending feet to support the device on the bottom of the containing vessel, substantially as described.

In testimony that I claim the foregoing as my own I have hereto affixed my signature in the presence of two witnesses.

ROBERT NELSON HARRIS.

Witnesses:
N. M. SEAGLE,
WM. P. HUFFMAN.